United States Patent [19]

Logsdon

[11] 4,385,777
[45] May 31, 1983

[54] DECORATIVE ESCUTCHEON CAPABLE OF INHIBITING THE PROPAGATION OF NOISE

[75] Inventor: Daniel D. Logsdon, Fullerton, Calif.

[73] Assignee: The Logsdon Foundation, Stanton, Calif.

[21] Appl. No.: 155,423

[22] Filed: Jun. 2, 1980

[51] Int. Cl.³ .............................................. F16L 41/00
[52] U.S. Cl. .......................................... 285/12; 16/2; 248/56; 285/46
[58] Field of Search .................... 285/46, 49, 12; 16/2; 248/56; 174/65 G, 152 G, 153 G

[56] References Cited

U.S. PATENT DOCUMENTS

| | | | |
|---|---|---|---|
| 1,502,154 | 7/1924 | Mueller et al. | 285/46 X |
| 2,631,819 | 3/1953 | Duncan | 248/56 X |
| 2,664,458 | 12/1953 | Rapata | 16/2 X |
| 3,615,108 | 10/1971 | Toth | 285/46 |

FOREIGN PATENT DOCUMENTS

| | | | |
|---|---|---|---|
| 824655 | 12/1951 | Fed. Rep. of Germany | 174/153 G |
| 407675 | 9/1966 | Switzerland | 16/2 |

Primary Examiner—Thomas F. Callaghan
Attorney, Agent, or Firm—K. H. Boswell; Edward D. O'Brian

[57] ABSTRACT

An escutcheon component system which fits around a pipe at the point wherein the pipe projects through a wall includes an escutcheon plate and a generally cylindrical insert. At least the periphery of the back side of the escutcheon plate is capable of abutting against the wall. A hole through the escutcheon plate is sized so that a pipe can pass through it. An annular flange extends outwardly from the back side of the escutcheon plate co-cylindrically with the hole. The insert is formed of a flexible material such that it is capable of being compressed and inserted into the interior of the flange. An opening through the center of the insert allows the insert to be passed over the pipe, and when located around the pipe the insert will grip the pipe if the insert is then compressed within the interior of the flange. When the insert is located around the pipe and within the flange frictional forces hold the escutcheon component system to the pipe.

14 Claims, 6 Drawing Figures

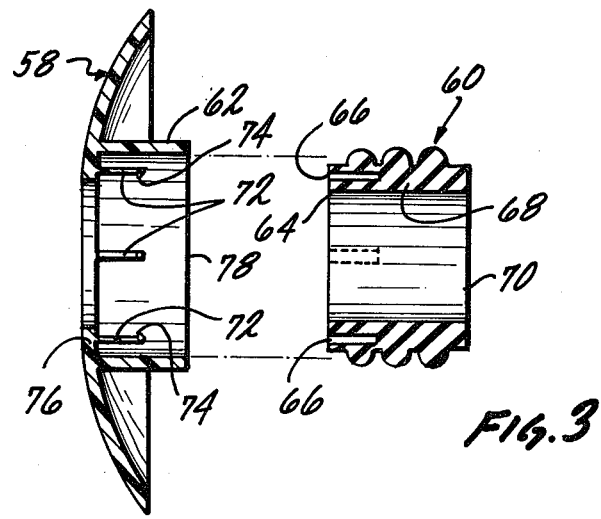
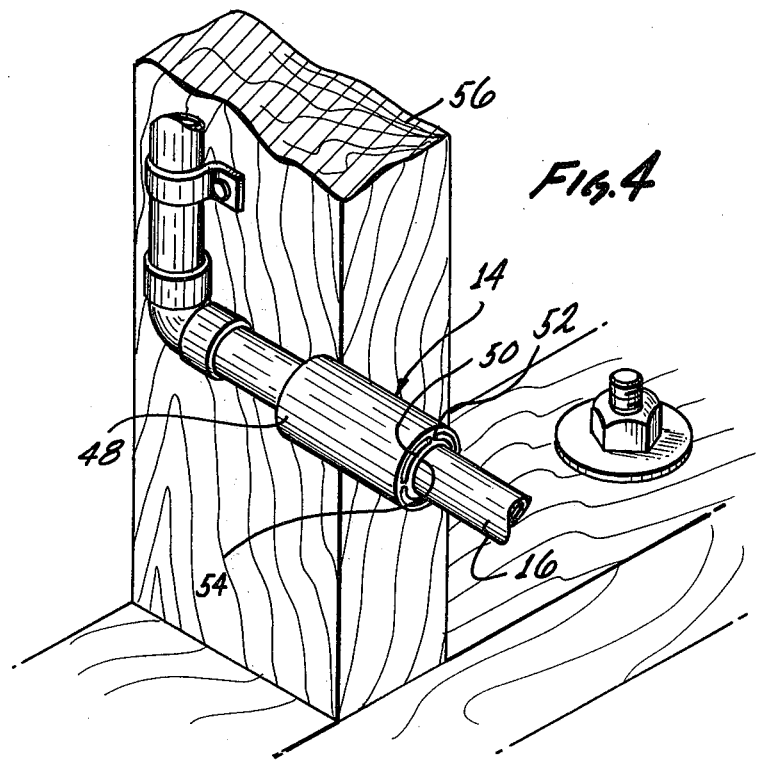

DECORATIVE ESCUTCHEON CAPABLE OF INHIBITING THE PROPAGATION OF NOISE

BACKGROUND OF THE INVENTION

This invention is directed to an escutcheon component system placed around a plumbing pipe wherein the plumbing pipe exits a wall. Included in the system are an escutcheon and an insert. The insert composed of a flexible material is placed around the pipe and then compressed within a flange on the back side of the escutcheon to frictionally engage the escutcheon plate to the pipe.

Escutcheons are commonly used in the plumbing industry to cover a generally irregular and/or oversized hole formed in a wall. The hole is so formed to allow a pipe or fixture component to project through the wall. Normally escutcheons are placed around pipes which feed hot or cold water to a faucet or other fixture and a common water pipe to a shower head or the like. Further, escutcheons are used around taps or other control fixtures normally found associated with showers, urinals and the like.

Presently two types of escutcheons find common use. Both of these generally have a metal escutcheon plate having a central hole. The escutcheon plate is shaped as a segment of a sphere and the hole is located in the center. On the back side of the escutcheon plate are one or more metallic fingers which are normally integrally formed with the escutcheon. The fingers are generally bent inwardly toward the center of the hole slightly such that the escutcheon can be slipped over the pipe with the pipe being frictionally engaged by the fingers.

The second method of mounting an escutcheon, generally used as escutcheons surrounding faucets and the like, is through the use of a set screw. In this type of escutcheon a threaded drilling is provided in the escutcheon. A set screw is threaded into the drilling and after the escutcheon is placed over the fixture or pipe the set screw is tightened against the surface of the pipe.

Both of the above noted types of escutcheons have several disadvantages. Since both of these types of escutcheons utilize a metal to metal contact via either the fingers or the set screw the escutcheon is in direct contact with the pipe. Any movement or vibration in the pipe is therefore transferred to the escutcheon. The escutcheon in turn, if it is appropriately abutted against a wall, can transfer the vibration to the wall. In certain instances this can serve to amplify the vibration.

A second disadvantage of the above noted escutcheon relates to the ease in which they can be displaced from their proper position on the pipe against the wall. In those types of escutcheons employing metal fingers these fingers can lose their tension in time and become loose or they can frictionally abrade into the pipe and with time become loose by this mechanism. Those escutcheons employing set screws are subject to loosening of the screw through the vibrations in the pipe which results in allowing the escutcheon to move with respect to both the pipe and wall.

A third disadvantage of the presently used escutcheon is that there are gaps formed between the escutcheon and the pipe. If the escutcheon used is the type employing fingers, these gaps are between the fingers. If the escutcheon used is the type employing a set screw, generally the escutcheon contacts the pipe only at the point 180° opposite where the set screw is located and at the set screw. The space along the sides of the hole in the escutcheon to both sides of the set screw is therefore open. Water condensing on the pipe inevitably will crawl along the surface of the pipe through the gaps or openings between the pipe and the escutcheons in the above noted escutcheons.

One of the above noted disadvantages is particularly acute when plastic pipe is used. The plastic pipe being relatively soft will be abraded or even punctured if a set screw is used and is subject to being easily abraded when fingers are used. Further, in those instances wherein metallic pipe passes through a metallic wall the use of metal to metal contact between the pipe, escutcheon and the wall can result in electrolysis or galvanic degradation of one or more of the pipe, escutcheon or the wall.

It is readily apparent that the presently used escutcheons while serving a decorative purpose in covering an uneven or oversized hole in a wall have certain defects which, if eliminated, would extend the useful life of the escutcheon and/or pipe and would result in suppression of transfer of noise from the pipe to a wall.

BRIEF SUMMARY OF THE INVENTION

In view of the above it is an object of this invention to provide an escutcheon component system which can be fixedly fastened to a pipe without utilization of metal to metal contact. It is a further object of this invention to provide an escutcheon component system which will inhibit the propagation of noise from a pipe to a wall and concurrently also inhibit the propagation of condensed liquid along the surface of a pipe wherein it passes through a wall. Additionally, it is an object of this invention to provide an escutcheon component system which is simply used and economical to manufacture.

These and other objects as will become evident from a remainder of the specification are achieved by providing an escutcheon component system including an escutcheon to be placed around a pipe wherein the pipe projects through a hole in a wall, said escutcheon component system being capable of suppressing the propagation of noise from the pipe to the wall and decoratively covering the hole in the wall which comprises: an escutcheon plate, said escutcheon plate having a front side and a back side, at least the periphery of the back side lying in a flat plane and capable of being placed in an abutting alignment with said wall; said escutcheon plate including a hole extending from the front side to the back side, said hole sized to be larger than the diameter of said pipe such that said pipe is capable of passing through said hole;

said escutcheon plate including an annular flange or tube extending outwardly from said back side of said escutcheon plate and located co-cylindrically with said hole in said escutcheon plate, the inside diameter of said annular flange being slightly greater than the outside diameter of said hole, the portion of the back side of said escutcheon plate located between the inside diameter of said annular flange and the periphery of said hole in said escutcheon plate forming an annular lip on said escutcheon plate within the interior of said annular flange; a generally cylindrically shaped insert having an outside generally cylindrical surface, said insert formed of a flexible material such that said insert is deformable under compression, said insert including a cylindrically shaped opening extending completely through said insert along the longitudinal axis of said insert, said opening sized to be approximately equal to the size of the outside diameter of said pipe; the outside diameter of said generally cylindrical insert being slightly larger than the inside diameter of said annular flange, said insert capable of fitting inside said annular flange and being positioned in said annular flange with one end of said insert abutting against said lip by compressing said flexible material of said insert inwardly toward said opening to reduce both the outside diameter of said insert and the diameter of said opening in said insert and when so reduced in diameter the opening of said insert capable of frictionally engaging about the outside surface of said pipe and when so compressed said insert capable of being frictionally retained within said annular flange.

Further, the preferred embodiment of this invention includes a gripping means positioned on the outer surface of the cylindrical insert to assist in the frictional retention of the insert within the annular flange. Additionally, a retaining means can be provided which is capable of mechanically restraining removal of the insert from the interior of the annular flange once the insert has been so located. In the preferred embodiment the annular flange is sized so as to extend outwardly from the back side of the escutcheon to a point beyond the flat plane wherein the periphery of the back side lies. This allows at least a portion of the annular flange to extend into the hole in the wall through which the pipe projects. To assist in forming a hole in the wall which has a set diameter which just accepts the annular flange without an unduly amount of space between the sides of the hole and the flange, a sleeve member can be provided. The sleeve member is sized to have the same outside diameter as the annular flange. The sleeve member includes positioning means which is capable of positioning the sleeve member about the pipe when the pipe projects through an oversized hole and provides a template surface in which to fill in the oversized hole about the pipe to form a hole which mimics the shape of the outside of the insert.

The insert can include at least one, but preferredly a plurality of, ridges on its outside surface which can be deformed inwardly by flexure such that when the insert is located within the annular flange the ridges assist in frictional engagement of the insert within the flange. The retaining means can include a first locking means on the insert and a second locking means on the escutcheon plate. The first and second locking means are capable of interacting to mechanically restrain withdrawal of the insert from the annular flange.

BRIEF DESCRIPTION OF THE DRAWING

This invention will be better understood when taken in conjunction with the drawings wherein:

FIG. 3 is a side elevational view in section showing an alternate embodiment of the invention;

FIG. 4 is an isometric view showing use of the sleeve component of the invention;

Figure 1:
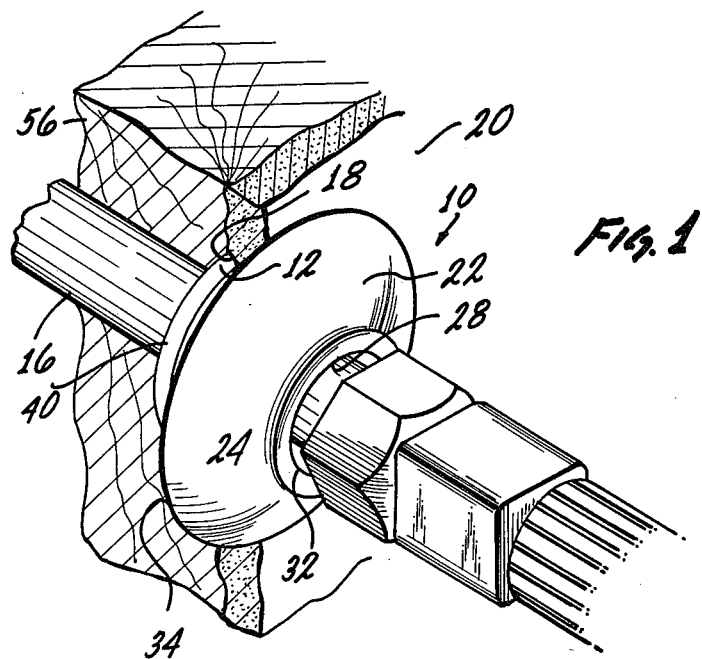
FIG. 1 is an isometric view of the invention showing its use with a wall which is shown in partial section.

The invention illustrated in the drawings and described in the specification utilizes certain principles and/or concepts as are set forth and claimed in the claims appended to this specification. Those skilled in the plumbing art to which this invention pertains will realize that these principles and/or concepts could be used with a number of embodiments which differ from the embodiment depicted herein, but which do not depart from the scope of the claims. It is for this reason that this invention is to be construed in view of the claims and is not to be construed as being limited to the exact embodiment depicted.

DETAILED DESCRIPTION

Figure 6:
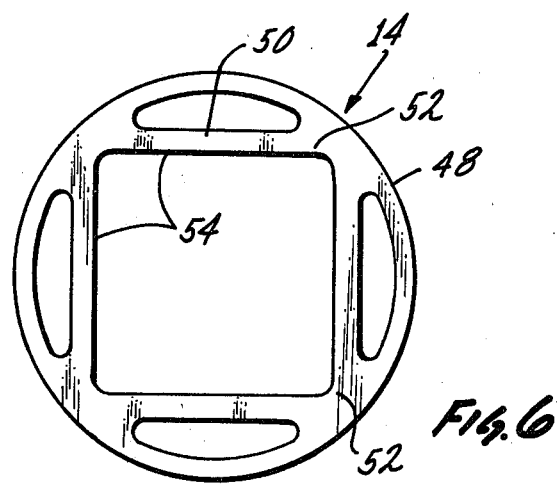
FIG. 6 is an end elevational view of the sleeve component of the invention.

FIG. 1 shows two components of the escutcheon component system of the invention and FIGS. 4 and 6 show the third component. The first two components shown in FIG. 1 include the escutcheon portion 10 and the inert 12. The third component shown in the other figures is the sleeve member 14. The escutcheon 10 and the insert 12 form a part of the invention which remains fixed to a pipe 16. They are used to cover the opening 18 wherein the pipe 16 projects through a wall 20.

Figure 2:
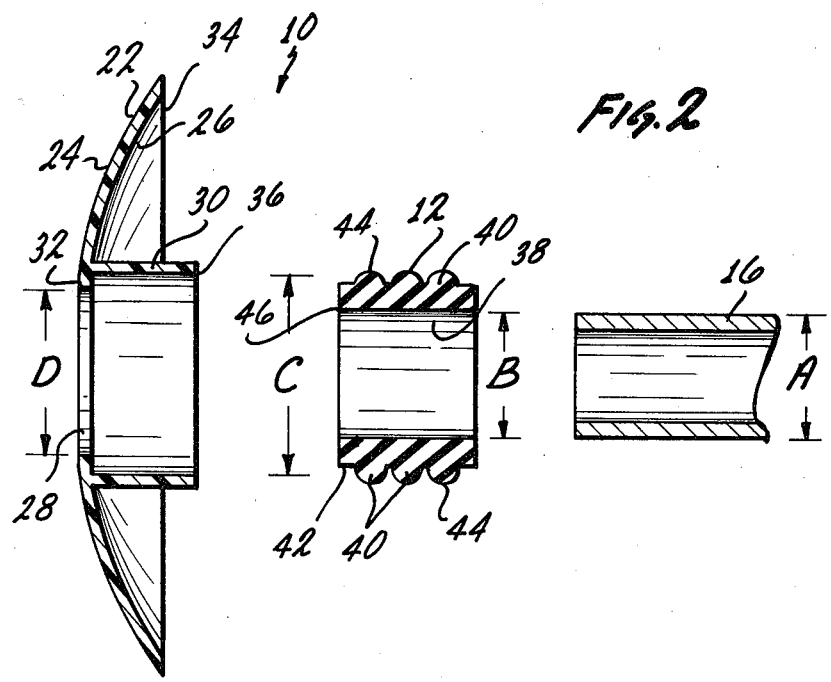
FIG. 2 is a side elevational view of the invention and including a piece of pipe necessary for understanding of the invention, but not forming a part thereof.

The escutcheon 10 is seen in isometric view in FIG. 1 and side elevation in FIG. 2. The escutcheon 10 has an escutcheon plate 22 which has a front side 24 and a back side 26. The escutcheon plate 22 includes a centralized hole 28. The hole opens up into the interior of annular flange or tube 30. The diameter of hole 28 is greater than the outside diameter of the pipe 16. This diameter identified by the line D is shown to be greater than the diameter identified by the line A in FIG. 2. This allows the pipe 16 to project through the hole 28 as is depicted in FIG. 1 in such a manner that the pipe 16 does not touch the outside periphery of the hole 28. As will be seen hereinafter the escutcheon 10 does not actually make direct contact with the pipe 16, but is in fact spaced from the pipe 16 by the insert 12.

The annular flange 30 has an inside diameter identified by the line C in FIG. 2 which is greater than the diameter of the hole 28 such that an annular lip 32 is formed within the interior of the annular flange 30. Annular lip 32 is in fact a continuation of the back side 26. The annular lip 32 prevents the insert from sliding within the annular flange 30 in the direction toward the front side 24.

The outside periphery 34 of the back side 26 lies within a flat plane and is capable of contacting the surface of wall 20. The meeting of the outside periphery 34 with the wall 20 is smooth and therefore makes a pleasant, decorative effect. As seen in FIG. 2 the length of the annular flange 30 is such that the end 36 of the flange 30 projects outwardly beyond the periphery 34.

The escutcheon plate 22 and the annular flange 30 are integrally formed together of a suitable material such as a decorative metal or hard plastic. Use of a hard plastic is preferred in that the escutcheon 10 can readily be formed using appropriately known molding techniques. Normally the escutcheon 10 will be formed of a thermoplastic material. This material is readily available, easily moldable and durable in use. The front side 24 of the escutcheon plate 22 can be readily molded as a segment of a sphere, thus making a gentle arc from the surface of the wall 20 toward the pipe 16.

The insert 12 has a generally cylindrical shape and includes a cylindrical opening 38. Opening 38 extends from one end of the insert 12 to the other. The diameter of opening 38, line B in FIG. 2, is approximately equal to or slightly greater than the diameter of pipe 16. This allows the insert 12 to be slid over the pipe 16.

The insert 12 is formed of a flexible, compressible material such as a rubber or the like. It is formed using suitable molding techniques known in the arts. Preferably the insert 12 includes a plurality of ridges collectively identified by the numeral 40. The ridges 40 extend around the outside of the outer surface 42 of the insert 12. Ignoring the arcuate ridges 40, the outer surface 42 of the insert 12 has an overall generally cylindrical shape and thus it is capable of fitting within the interior of the annular flange 30. Preferredly the ridges 40 each individually encircle the sleeve 12. Alternately a single ridge could spiral down in a helical fashion along the length of the insert 12.

The outside diameter of the insert 12 (in the preferred embodiment this would be the diameter across the top of the peaks 44 of the ridges 40) has a diameter which is slightly greater than the inside diameter, line C, of annular flange 30. When the insert 12 is pushed into the interior of the annular flange 30, the flexible material from which the insert 12 is formed is compressed inwardly toward the interior of the opening 38. The compressibility of this flexible material allows the insert 12 to fit within the interior of the annular flange 30 even though the outside diameter of the insert 12 is slightly larger than the inside diameter of the annular flange. When the insert 12, however, is inserted within the annular flange 30 by compression of its flexible material, the opening 38 is slightly reduced in diameter. Because of this reduction in the diameter of the opening 38, when the insert 12 is within the annular flange 30 the pipe 16 can be fixedly held by friction within the opening 38.

In use, first the insert 12 is slid within the annular flange 30 until end 46 of insert 12 abuts against lip 32. This fixedly positions the insert 12 within the escutcheon 10. The combination of the insert 12 and escutcheon 10 are then slid along the pipe 16. This is done with some resistance, however, since opening 38 frictionally engages pipe 16. Once the escutcheon 10 is inserted over pipe 16 a sufficient distance such that the outside periphery 34 abuts against the wall 20, pressure is released off the escutcheon 10 and it is now fixedly held by frictional forces to the pipe 16. There is a frictional force between the pipe 16 and the interior of the opening 38 as well as a frictional force between the outside surface 42 of the insert 12 and the interior of the annular flange 30.

As so placed in the preceding paragraph the escutcheon 10 is completely isolated from the pipe 16 by the insert 12. Any noise propagated within the pipe 16 is dampened by the flexible nature of the insert 12 and is therefore not communicated to the escutcheon 10. Because the escutcheon 10 is the only component which contacts the wall 20 and it is insulated by the insert 12, noise propagated within the pipe 16 is isolated from the wall 20. Further, the opening 38 has been reduced by the compression of the insert 12 such that it fits tightly around the total outside surface of the pipe 16 and thus makes an effective moisture barrier with the pipe 16.

The opening 18 can be provided in the wall 20 to be sized to accept the annular flange 30 without being oversized or irregular by the use of the sleeve member 14. As seen in FIG. 6 sleeve member 14 has an outer cylindrical wall 48 with an inner tubular member 50 centered within the cylindrical wall 48 by the use of a plurality of fins collectively identified by the numeral 52. When appropriately placed over a pipe 16 the tubular member 50 and the fins 52 place the cylindrical walls 48 such that it is co-cylindrical with the pipe 16.

The sleeve member 14 is integrally formed as a unitary body from a material such as polyethylene or the like. The material used is chosen such that (1) it is moldable; (2) it is inexpensive and disposable; and (3) it is cold flowable or distortable.

In the preferred embodiment shown in the figures the tubular member 50 is shaped in cross section as a square. The points of the square are appropriately joined at their corners with the fins 52. While the square shape is preferred, any regular polyhedron shape could be utilized such as a triangular shape, a pentagon and the like. In any event, when the sleeve member 14 is inserted over a pipe 16 the walls, collectively identified by the numeral 54, of the tubular member can be distorted or bowed as is depicted in FIG. 4. Normally the width of the square formed by the walls 54 will be slightly less than the diameter of the pipe 16 but the diagonal of the square formed by the walls 54 will be greater than the diameter of the pipe 16. Because of this, the center of the walls 54 can be distorted into curved shapes when the sleeve member 14 is placed over the pipe 16. This will fixedly hold the sleeve member 14 in a co-cylindrical manner with respect to pipe 16 yet allow for its easy withdrawal from the pipe 16 when the sleeve member 14 has served its purpose.

Figure 5:
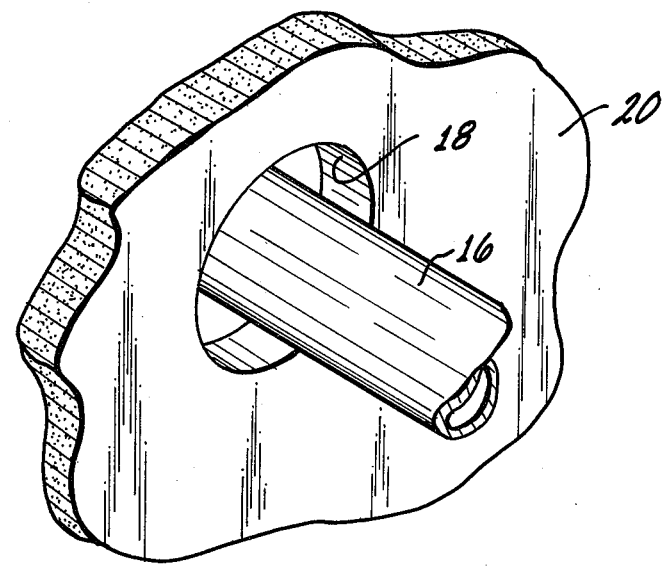
FIG. 5 is an isometric view showing a wall and a pipe which, while not forming a part of the invention, shows their relationship with each other after using the sleeve component shown in FIG. 4.

In use the sleeve member 14 is inserted over a pipe 16 as depicted in FIG. 4 prior to placement of drywall or other wall material over the wall studs 56. The drywaller then grossly extimates the position of the pipe 16 with respect to the drywall and cuts an appropriately oversized hole in the drywall. The drywall is then attached to the wall studs 56 with the pipe 16 projecting through the oversized and/or irregular shaped hole. Sleeve 14 is now placed in pipe 16. The sleeve member 14 is sized such that its length is sufficient to ensure that it projects beyond both the interior and exterior surface of the drywall. The area between the inside periphery of the oversized and/or irregular shaped hole in the drywall and the cylindrical wall 48 of the sleeve member 14 is then filled in with an appropriate patching compound as is commonly used in the drywall arts for patching seams, holes and the like. After this patching compound has dried or set as may be the case, the sleeve member 14 is withdrawn from the pipe 16 leaving a perfectly shaped and sized hole 18 around the pipe 16 as is depicted in FIG. 5. The escutcheon 10 and insert 12 combination, as previously discussed, can then be slipped over pipe 16 appropriately positioning the annular flange 30 within the hole 18. Because the hole 18 is perfectly sized and shaped the annular flange 30 can form an abutting relationship with the hole 18 to effectively seal the hole 18 against passage of moisture or insects.

In the alternate embodiment shown in FIG. 3 the escutcheon 58 and the insert 60 differ slightly from those previously described in that a retaining means is utilized which will resist dislodgement of the insert 60 from the interior of the escutcheon 58 once the insert 60 has been inserted within the annular flange 62 of the escutcheon 58. The retaining means utilizes a first and second locking means, one located on the escutcheon 58 and the other on the insert 60, to form a mechanical lock between these two pieces.

The insert 60 is essentially identical to the insert 12 except that extending circumferentially around end 64 of insert 60 is a channel 66. The channel 66 extends from end 64 partway into the cylindrical wall 68 of the insert 60 toward the other end 70 of the insert 60.

The escutcheon 58 is similar to the escutcheon 10 except that it is provided with a plurality of fingers collectively identified by the numeral 72 each having a hook 74 on their end. The fingers 72 project from the lip 76 within the annular flange 62 outwardly toward the end 78 of the annular flange 62. The fingers 72 are positioned with respect to the distance away from the annular flange 62 and the channel 66 is positioned within the wall 78 of the insert 60 such that when the insert 60 is slid into the annular flange 62 the fingers 72 and their hooks 74 on the end thereof will be positioned such that they slide into the channel 66. The hooks 74 are positioned on the fingers 72 such that they can slide into the channel 66 but once located therein they are capable of engaging the flexible material from which the insert 60 is formed of and becoming physically lodged into this flexible material. The hooks 74 thus are somewhat analogous to the use of fish hooks and the like.

Once the insert 60 is inserted within the annular flange 62 the interaction of the hooks 74 with the interior walls (not numbered) of the channel 66 essentially prevents withdrawal of the insert 60 from the interior of the annular flange 62.

The escutcheon 58 and the insert 60 are formed of the same material as noted for the escutcheon 10 and the insert 12, and in the same manner. The escutcheon 58 and insert 60 would be used for certain installations wherein an unauthorized individual would be tempted to remove the escutcheon 58 once it is put in place. It would therefore be used in such places such as public lavatories and the like. For use in other places such as in the home wherein such unauthorized removal would not take place, the use of the escutcheon 10 and insert 12 would be preferred.

I claim:

1. An escutcheon component system including an escutcheon to be placed around a pipe wherein the pipe projects through a hole in the wall, said escutcheon components system being capable of suppressing the propagation of noise from the pipe to the wall and decoratively covering the hole in the wall which comprises:

an escutcheon plate, said escutcheon plate having a front side and a back side, at least the periphery of the back side lying in a flat plane and capable of being placed in an abutting alignment with said wall;

said escutcheon plate including a hole extending from the front side to the back side, said hole sized to be larger than the diameter of said pipe such that said pipe is capable of passing through said hole;

said escutcheon plate including a tube integrally formed with said plate and extending outwardly from said back side of said escutcheon plate and located co-cylindrically with said hole in said escutcheon plate and being adapted to be positioned in the hole in the wall, the inside diameter of said tube being slightly greater than the diameter of said hole in said escutcheon plate, the portion of the back side of said escutcheon plate located between the inside diameter of said tube and the periphery of said hole in said escutcheon plate forming an annular lip on said escutcheon plate within the interior of said tube;

a generally cylindrically shaped insert having an outside generally cylindrical surface, said insert formed of a flexible material such that said insert is deformable under compression, said insert including a cylindrically shaped opening extending completely through said insert along the longitudinal axis of said insert, said opening sized to be approximately equal to the size of the outside diameter of said pipe;

the outside diameter of said generally cylindrical insert being slightly larger than the inside diameter of said tube, said insert capable of fitting inside said tube and being positioned in said tube with one end of said insert abutting against said lip by compressing said flexible material of said insert inwardly toward said opening to reduce both the outside diameter of said insert and the diameter of said opening in said insert and when so reduced in diameter the opening of said insert capable of frictionally engaging about the outside surface of said pipe and when so compressed said insert capable of being frictionally retained within said tube, gripping means positioned on the outer surface of said cylindrical insert, said gripping means assisting in said frictional retention of said insert within said tube, retaining means operatively associated with said escutcheon plate and said insert and capable of mechanically restraining movement of said insert from within said tube once said insert has been inserted into said tube, said cylindrical insert having at least one ridge extending circumferentially around said outside cylindrical surface of said insert, said ridge integrally formed with said insert of said flexible material such that said ridge is capable of being deformed inwardly by flexure of said flexible material under compression.

2. An escutcheon component system including an escutcheon to be placed around a pipe wherein the pipe projects through a hole in the wall, said escutcheon system being capable of suppressing the propogation of noise from the pipe to the wall and decoratively covering the hole in the wall which comprises:

an escutcheon plate, said escutcheon plate having a front side and a back side, at least the periphery of the back side lying in a flat plane and capable of being placed in an abutting alignment with said wall;

said escutcheon plate including a hole extending from the front side to the back side, said hole sized to be larger than the diameter of said pipe such that said pipe is capable of passing through said hole;

said escutcheon plate including an annular flange extending outwardly from said back side of said escutcheon plate and located co-cylindrically with said hole in said escutcheon plate, the inside diameter of said annular flange being slightly greater than the diameter of said hole, the portion of the back side of said escutcheon plate located between the inside diameter of sad annular flange and the periphery of said hole in said escutcheon plate forming an annular lip on said escutcheon plate within the interior of said annular flange;

a generally cylindrically shaped insert having an outside generally cylindrical surface, said insert formed of a flexible material such that the insert is deformable under compression, said insert including a cylindrically shaped opening extending completely through said insert along the longitudinal axis of said insert, said opening sized to be approximately equal to the size of the outside diameter of said pipe;

the outside diameter of said generally cylindrical insert being slightly larger than the inside diameter of said annular flange, said insert capable of fitting inside said annular flange and being positioned in said annular flange with one end of said insert abutting against said lip by compressing said flexible material of said insert inwardly toward said opening to reduce both the outside diameter of said insert and the diameter of said opening in said insert and when so reduced in diameter the opening of said insert capable of frictionally engaging about the outside surface of said pipe and when so compressed said insert capable of being frictionally retained within said annular flange;

said annular flange is sized to extend outwardly from said back side of said escutcheon plate to a point beyond said flat plane wherein said periphery of said back side lies;

said wall including a hole sized at least as large as the outside diameter of said annular flange such that a portion of said annular flange can extend into said hole when said periphery of said back side is in abutting alignment with said wall.

3. The escutcheon component system of claim 2 including:

a sleeve member sized radially to have an outside cylindrical surface of the same diameter as the outside diameter of said annular flange;

said sleeve member including pipe positioning means located in the interior of said sleeve member and capable of positioning said sleeve member about said pipe such that the outside cylindrical surface of said sleeve member is co-cylindrical with said pipe;

said sleeve member capable of sliding onto said pipe and being retained in said co-cylindrical manner on said pipe when said pipe projects through a hole in said wall and said hole in said wall is sized to be of a larger dimension than the outside diameter of said sleeve member;

said sleeve member sized longitudinally to have a length such that when said sleeve member is slid onto said pipe and into said hole in said wall a portion of said sleeve member is capable of projecting outwardly from the outside surface of said wall;

said sleeve member including said portion extending outwardly from said wall capable of serving as a template such that portions of said hole in said wall located radially outwardly from the outside cylindrical surface of said sleeve member can receive a portion of patching material to reduce the size of said hole to the size of the outside cylindrical surface of said sleeve and to shape the shape of said hole to mimic the shape of the outside cylindrical surface of said sleeve when said sleeve is withdrawn off of said pipe.

4. The escutcheon component system of claim 2 including:

gripping means positioned on the outer surface of said cylindrical insert, said gripping means assisting in said frictional retention of said insert within said annular flange.

5. The escutcheon component system of claim 4 including:

retaining means operatively associated with said escutcheon plate and said insert and capable of mechanically restraining movement of said insert from within said annular flange once said insert has been inserted into said annular flange.

6. The escutcheon component system of claim 5 including:

said cylindrical insert having at least one ridge extending circumferentially around said outside cylindrical surface of said insert, said ridge integrally formed with said insert of said flexible material such that said ridge is capable of being deformed inwardly by flexure of said flexible material under compression.

7. The escutcheon component system of claim 6 wherein:

said retaining means includes a first locking means positioned on said insert and a second locking means positioned on said back side of said escutcheon plate, said first and said second locking means interacting with each other to form a mechanical lock between said escutcheon plate and said insert.

8. The escutcheon component system of claim 7 wherein:

said first locking means comprises the end of said insert which is capable of abutting against said lip and including an annularly extending channel extending circumferentially around said insert between said outside cylindrical surface of said insert and said cylindrical opening and extending for a portion of the longitudinal length of said insert from said end capable of abutting against said lip toward the other end of said insert;

said second locking means comprises at least one projection projecting from said lip within said annular flange away from said back side of said escutcheon plate, said projection including a channel locking means located on said projection and capable of mechanically interacting with said channel in said insert to fixedly hold said projection within said channel when said insert is inserted into said annular flange.

9. The escutcheon component system of claim 8 wherein:

said channel locking means comprises at least one hook capable of protruding into the flexible material which forms the inside of said channel in said insert and being lodged into said flexible material in a manner inhibiting the withdrawal of said insert from said annular flange once said insert has been inserted into said annular flange.

10. The escutcheon component system of claim 2 wherein:

at least the front side of said escutcheon plate is shaped as a segment of a sphere having said hole centered within said segment.

11. The escutcheon component system of claim 9 wherein:

at least the front side of said escutcheon plate is shaped as a segment of a sphere having said hole centered within said segment.

12. The escutcheon component system of claim 3 wherein:

said sleeve member comprises an outside elongated cylindrical wall, an interior tubular member, and a plurality of connecting fins fixedly connecting between said interior tubular member and the inside surface of said outside elongated cylindrical wall;

said fins positioning said tubular member within said cylindrical wall such that when said sleeve member is slid over said pipe said pipe is located within said tubular member.

13. The escutcheon component system of claim 12 wherein:

said tubular member is shaped in cross-section as a symmetrical polyhedron;

said sleeve member being formed of a semi-resilient material and each of the sides of said symmetrical polyhedron capable of being distorted in an arcuate manner by the outside surface of said pipe when said pipe is located within said tubular member.

14. The escutcheon component system of claim 13 wherein:

said tubular member is shaped in cross-section as a square and is connected to said outside cylindrical wall by fins positioned at the corners of said square such that the centers of each of the walls of the squares are capable of being distorted toward the cylindrical wall when said pipe is located within said tubular member.

* * * * *